United States Patent [19]
Olds et al.

[11] Patent Number: 5,574,969
[45] Date of Patent: Nov. 12, 1996

[54] METHOD AND APPARATUS FOR REGIONAL CELL MANAGEMENT IN A SATELLITE COMMUNICATION SYSTEM

[75] Inventors: Keith A. Olds; Tadd E. Spicer, both of Mesa; David Terris, Phoenix, all of Ariz.

[73] Assignee: Motorola, Inc., Schaumburg, Ill.

[21] Appl. No.: 336,140

[22] Filed: Nov. 8, 1994

[51] Int. Cl.$^6$ .................................................. H04B 7/185
[52] U.S. Cl. ...................... 455/12.1; 455/33.4; 455/34.1; 455/54.1; 455/63
[58] Field of Search .................................. 455/33.1, 33.2, 455/33.4, 34.1, 34.2, 54.1, 56.1, 62, 63, 67.1, 67.3, 11.1, 13.1, 12.1, 13.3; 379/59, 60; 342/354

[56] References Cited

U.S. PATENT DOCUMENTS 5,123,112  6/1992  Choate ........................ 455/62
5,268,694  12/1993  Jan et al. .................... 455/63
5,394,561  2/1995  Freeburg ..................... 455/63

Primary Examiner—Reinhard J. Eisenzopf
Assistant Examiner—Nguyen Vo
Attorney, Agent, or Firm—Gregory J. Gorrie

[57] ABSTRACT

In a satellite communication system, communication channels are dynamically assigned in real-time based on actual demand using a regionalized channel assignment and reuse scheme. The tradeoff between system capacity and channel interference is optimized through the use of interlocking local regions. Satellite communication stations within a radio line-of-sight of each other make up each local region. The communication stations of a local region change as the communication stations move through orbital positions. Channel reuse rules are adapted to system load and demand for services. Each communication station establishes its local region and notifies the other communication stations within its local region whenever it assigns a communication channel to a subscriber unit. Channel assignments within each local region are maintained locally by the defining communication station.

19 Claims, 4 Drawing Sheets

METHOD AND APPARATUS FOR REGIONAL CELL MANAGEMENT IN A SATELLITE COMMUNICATION SYSTEM

TECHNICAL FIELD OF THE INVENTION

The present invention relates generally to cellular communication systems that broadcast within multiple antenna beams and communicate with users located within individual beams. More specifically, the present invention relates to satellite communication systems that assign communication channels to users within individual antenna beams.

BACKGROUND OF THE INVENTION

In cellular communication systems, communication channels are generally assigned to a subscriber unit when an acquisition request is received by the system. The assigned communication channel is chosen so as not to interfere with other communication channels currently in use in the same cell or region that the subscriber unit is located. The assigned communication channel is also chosen so as not to interfere with other communication channels currently in use in neighboring cells.

Prior art communication systems that allocate communication channels based on predicted traffic demand suffer from the problem that predicted demand is not very accurate. This results in improper allocation of channels and is inefficient. Real-time channel allocation optimally requires complete knowledge of all channel assignments within the system. Because of propagation delays and limited data-link capacities, real-time knowledge of channel assignments is impractical in a global communication system.

In a global communication system that includes satellite communication stations, an optimum approach to channel allocation and assignment requires global knowledge of all channels assigned and presently in use. An advantage to global knowledge is that indirect interaction between channel assignments on satellites can be planned which allows for maximum utilization of available channel resources. For example, channels assigned over India have an impact on the channels available to be assigned over Europe by restricting the channels that may be assigned in Central-Asia and the Middle-East. Real-time knowledge allows the placement of capacity where the demand is. Disadvantages to this approach include the limited ability to transfer this information in real-time when the communication covers great distances. Other disadvantages to global knowledge approaches include the extensive use of data channels to continually transfer channel assignment information.

Thus what is needed are a method and apparatus to dynamically assign communication channels to subscriber units in real-time without complete knowledge of all channel assignments in the system. What is also needed are a method and apparatus for assigning communication channels that have the effect of real-time knowledge without the disadvantages discussed above. Further, what is needed are a method and apparatus that assigns communication channels to subscriber units using a channel reuse scheme that avoids interference with other assigned channels in a satellite-based communication systems.

DETAILED DESCRIPTION OF THE DRAWINGS

The present invention provides, among other things, a dynamic, real-time method and apparatus for adaptively assigning channels to subscriber units. In a satellite communication system, communication channels are dynamically assigned in real-time based on actual demand using a regionalized channel assignment and reuse scheme. The tradeoff between system capacity and channel interference is optimized through the use of interlocking local regions. Satellite communication stations within a radio line-of-sight of each other preferably make up each local region. The communication stations comprising a local region may change as the communication stations move through orbital positions. Channel reuse rules are adapted to system load and demand for services. Each communication station establishes its local region and notifies the other communication stations within its local region whenever it assigns a communication channel to a subscriber unit. Channel assignments within each local region are maintained locally by the defining communication station.

A "satellite" is defined herein to mean a man-made object or vehicle intended to orbit earth and includes both geostationary and orbiting satellites and/or combinations thereof including low-earth orbiting (LEO) satellites. A "constellation" is defined herein to mean an ensemble of satellites arranged in orbits for providing specified coverage (e.g., radio communication, photogrammetry, etc.) of portion(s) or all of earth. A constellation typically includes multiple rings (or planes) of satellites and may have equal numbers of satellites in each plane, although this is not essential. As used herein the terms "cell" and "antenna beam" are not intended to be limited to any particular mode of generation and include those created by either terrestrial or satellite cellular communications systems and/or combinations thereof. The present invention is applicable to systems including satellites having low-earth orbits. Additionally, it is applicable to orbits having any angle of inclination (e.g., polar, equatorial or other orbital pattern).

Figure 1:
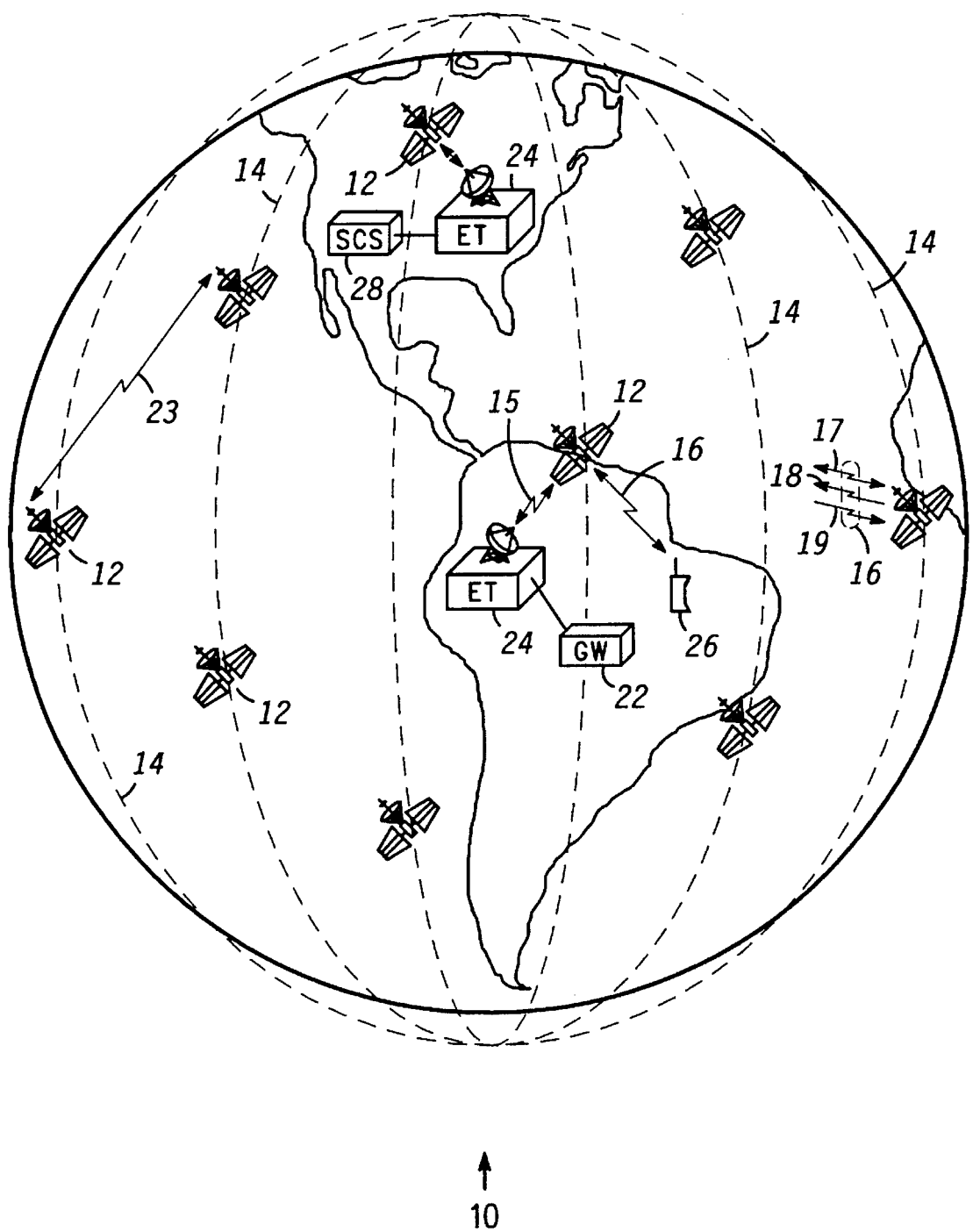
FIG. 1 illustrates a highly simplified diagram of a satellite-based communication system with which the present invention may be practiced.

FIG. 1 illustrates a highly simplified diagram of satellite-based communication system 10 with which the present invention may be practiced. Communication system 10 uses six polar orbits 14, with each orbit 14 holding eleven satellite communication stations 12 for a total of sixty-six satellites 12. However, this is not essential and more or fewer satellites, or more or fewer orbits, may be used. While the present invention is advantageously employed when a large number of satellites are being used, it is also applicable for a small number of satellites. For clarity, FIG. 1 illustrates only a few satellite communication stations 12.

For example, each orbit 14 encircles earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of earth at any instant.

For the example shown, satellites 12 travel with respect to earth at around 25,000 km/hr, allowing satellite 12 to be visible to a terrestrial station for a maximum period of approximately nine minutes. Satellite communication stations 12 communicate with terrestrial stations which may include some number of radio communication subscriber units (SUs) 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the earth or in the atmosphere above the earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. These data messages include both ring-alerts which notify a subscriber unit that another party desires communication, as well as pages which deliver specific messages. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a TDMA scheme is desirably used to divide time into frames, preferably in the 60–90 millisecond range. Particular traffic channels 17 are assigned particular transmit and receive time-slots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. In the preferred embodiment, cross links 23 are Ka-band frequency channels. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
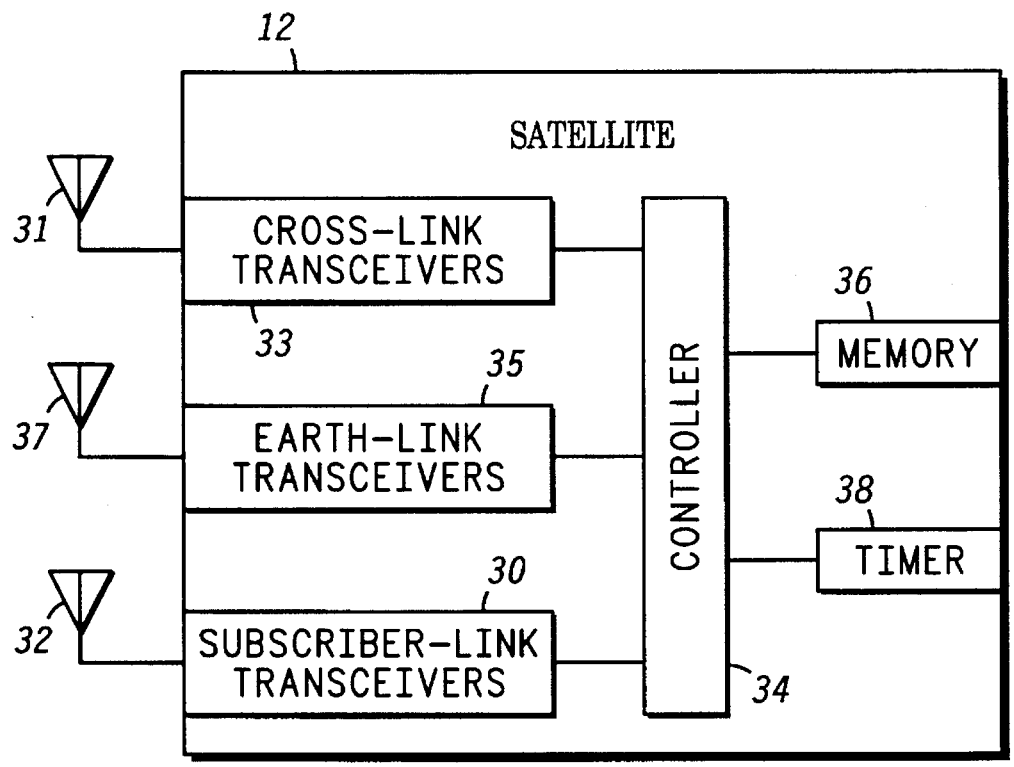
FIG. 2 illustrates a simplified block diagram of a satellite communication station suitable for use in a preferred embodiment of the present invention.

FIG. 2 illustrates a simplified block diagram of satellite communication station 12 suitable for use in a preferred embodiment of the present invention. Preferably, all satellites 12 within system 10 (see FIG. 1) include equipment as illustrated by the block diagram of FIG. 2. Satellite 12 includes cross-link transceivers 33 and associated antennas 31. Transceivers 33 and antennas 31 support cross-links to other nearby satellites 12. Earth-link transceivers 35 and associated antennas 37 support earth-links to communicate with earth terminals 24 (FIG. 1). Subscriber-link transceivers 30 and associated antennas 32 support subscriber units 26 (FIG. 1). Preferably, each satellite 12 may simultaneously support a link for up to several thousand or more of subscriber units 26 (FIG. 1). Of course, those skilled in theeart will appreciate that antennas 31, 37, and 32 may be implemented either as single multi-directional antennas or as banks of discrete antennas. It is desirable that each subscriber-link antenna 32 be a phased array antenna capable of accessing many antenna beams simultaneously.

A controller 34 couples each of transceivers 33, 35, and 30 as well as to a memory 36 and a timer 38. Controller 34 may be implemented using one or more processors. Controller 34 uses timer 38 to maintain, among other things, the current date and time. Memory 36 stores data that serve as instructions to controller 34 and that, when executed by controller 34, cause satellite 12 to carry out procedures which are discussed below. In addition, memory 36 includes variables, tables, and databases that are manipulated during the operation of satellite 12.

Subscriber-link transceivers 30 are desirably multi-channel FDMA/TDMA transceivers capable of transmitting and receiving on all different selectable frequencies during particular, selectable, time-slots as directed by controller 34. Subscriber-link transceivers 30 contain multi-channel radios having a sufficient number of channels to provide the desired number of transmission and reception frequencies for signal access and control and for the user voice and/or data. Controller 34 may provide for allocation of the frequency and time-slot assignments, antenna beam-to-antenna beam hand-off and other overhead and management and control functions. Subscriber-link transceivers 30 desirably provide for transmission and reception on any frequency channel set so that each subscriber-link transceivers 30 may, if needed, utilize the entire spectral capacity of all frequency channel sets by having the capability to handle all frequency and time-slot assignments.

Figure 3:
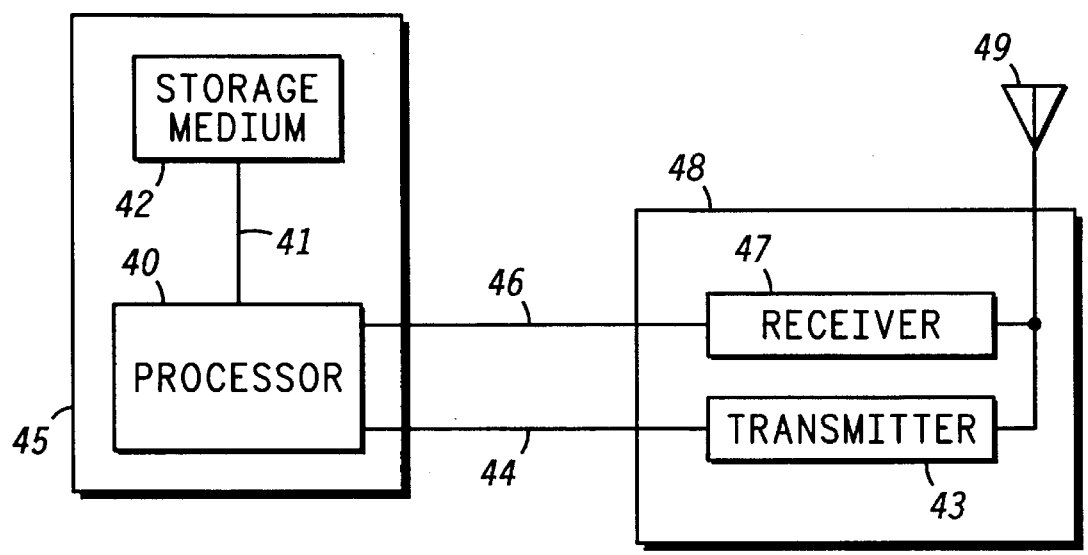
FIG. 3 illustrates a simplified block diagram of a system control station and a terrestrial station suitable for use in a preferred embodiment of the present invention.

FIG. 3 illustrates a simplified block diagram of system control station 45 and terrestrial station 48 suitable for use in a preferred embodiment of the present invention. Control station 45 and terrestrial station 48 are desirable part of SCS 28 (FIG. 1) and ET 24 (FIG. 1) respectively. Control station 45 comprises processor 40 coupled to associated storage medium 42 (e.g., random access memory or RAM, other semiconductor or magnetic read-write memory devices, optical disk, magnetic tape, floppy disk, hard disk etc.) via link 41. Terrestrial station 48 includes antenna 49 coupled to transmitter 43 and receiver 47. Transmitter 43 and receiver 47 are coupled to processor 40 via links 44 and 46, respectively. Processor 40 desirably carries out procedures exemplified below and described in the associated text. For example, in addition to performing other tasks as appropriate, processor 40 desirably stores results from such procedures in storage medium 42. Transmitter 43 and/or receiver 47 transmit messages to and/or receive messages from satellites 12.

Processor 40 generally controls and manages user access, message reception and transmission, channel set-up, radio tuning, frequency and time-slot assignment, and other cellular radio communication and control functions not managed or provided for by controller 34 (FIG. 2). Among other things, processor 40 and/or controller 34 (FIG. 2) desirably executes procedures to allow user access to communication system 10. This may include procedures for protocols for channel setup and other associated functions as discussed below.

Figure 4:
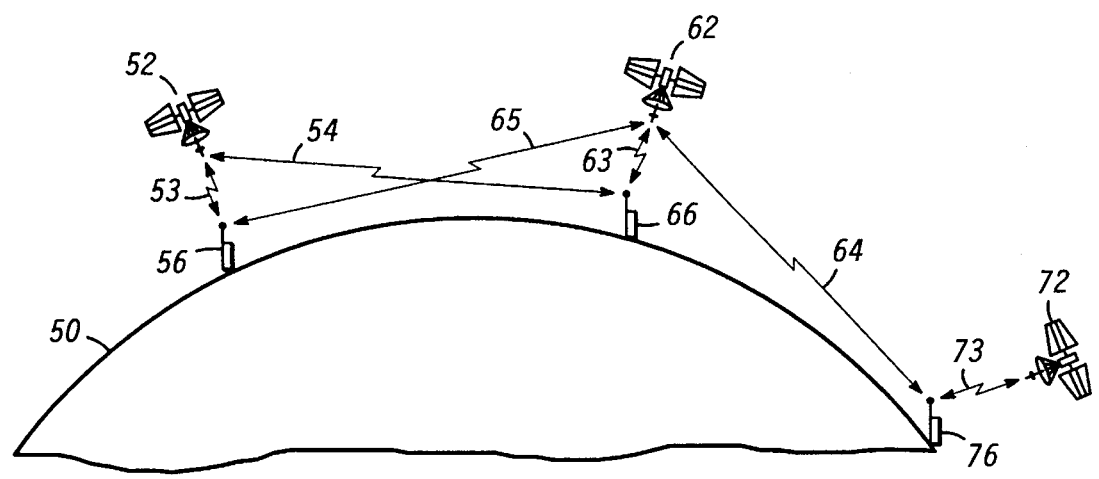
FIG. 4 illustrates a low-earth orbit satellite interference scenario.

FIG. 4 illustrates a low-earth orbit satellite interference scenario. Direct interference and a chain reaction effect of channel assignment drive the need for real-time global knowledge in an optimum channel allocation process. Direct interference may occur when channels in use on a particular satellite interfere with channels on other satellites which are within a line-of-sight each other. This is described in more detail below.

The chain reaction effect of channel assignment occurs when a satellite assigns a channel to a subscriber unit. The available channels on neighboring satellites within its line-of-sight are limited to non-interfering channels. This limitation restricts the channels that may be assigned by other satellites not in the line-of-sight of the original assigning satellite. Thus, the assignment of a channel by a satellite has consequences on channel availability on all other satellites in the entire constellation.

Referring to FIG. 4, satellites 52, 62 and 72 are communication satellites preferably in a low-earth orbit analogs to satellite communication stations 12 (FIGS. 1 and 2). Satellites 52, 62 and 72 communicate with subscriber units analogs to SU 26 (FIG. 1). As shown, satellite 52 has established a communication link with subscriber unit 56 over communication link 53; satellite 62 has established a communication link with subscriber unit 66 over communication link 63; and satellite 72 has established a communication link with subscriber unit 76 over communication link 73. Subscriber units 56, 66 and 76 are shown located on the surface of earth 50. Satellite 62 is within a radio line-of-sight of satellites 52 and 72. Therefore, satellite 62 can interfere with RF communications of satellites 52 and 72. Satellites 52 and 72 are not within a radio line-of-sight of each other and therefore cannot interfere with the RF communications of each other. In other words, radio frequency signals can directly be sent from satellites 62 to either satellite 52 or satellite 72, but radio frequency signals cannot be sent between satellites 52 and 72.

Satellite 62, when communicating with subscriber unit 66, has interference paths 64 and 65 to subscriber units 76 and 56 respectively. Satellite 52 has interference path 54 with subscriber unit 66. To prevent interference with satellite 62, satellites 52 and 72 must choose communication channels for communication links 53 and 73 that will not interfere with communication link 63. As a result of choosing non-interfering channels, the choice of channels on satellite 52 is constrained by the choice of channels on satellite 62, and vice versa. The choice of channels on satellite 52 is also constrained by channels assigned by satellite 72, and vice versa. Thus, an assignment of channels by one satellite produces chain reaction limiting the channels available for assignment by other satellites.

An optimum channel assignment requires real-time knowledge of all channels in use by the entire system (i.e., global knowledge). Global knowledge is desirable because of the chain reaction effect of channel assignment described above. True real-time knowledge of all channel assignments in a world-wide communication system is impossible due to finite propagation delay of communication signals. Near real-time knowledge is impractical because excessive status reporting would be required which would require significant communication resources. The allocation of communication channel resources based on expected or predicted traffic is one attempt at a near-optimum solution. However, the uncertainty in predicted traffic may result in significant inefficiency. As described below, near real-time channel assignment information in a local area provides a near-optimum solution to channel assignment.

Figure 5:
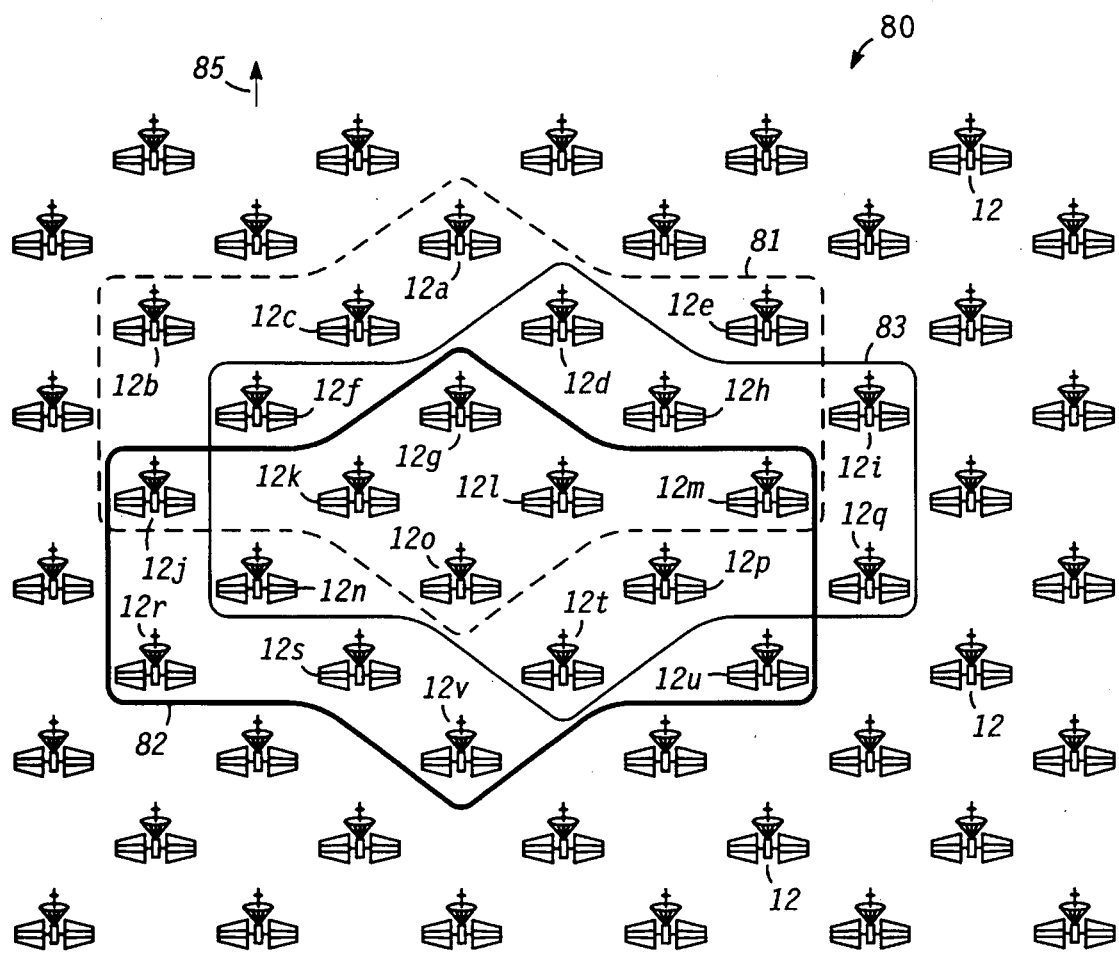
FIG. 5 shows a simplified example of interlocking local regions defined by satellite communication stations suitable for use in a preferred embodiment of the present invention.

FIG. 5 shows a simplified example of interlocking local regions defined by satellite communication stations suitable for use in a preferred embodiment of the present invention. Satellites of the constellation (see FIG. 1) are organized into a plurality of interlocking local regions comprised of several nearby satellites. Each satellite obtains most of the required knowledge for correct channel assignments in near real-time without the need for each satellite to have knowledge of all the channel assignments in the entire system. A near-optimum solution is obtained with knowledge of channel assignments of the local region.

FIG. 5 shows portion 80 of a constellation of satellites 12. In the preferred embodiment, satellites 12 are in a low-earth orbit surrounding the earth, and as a result, satellites 12 are not located in a planar configuration as shown on a sheet of paper, but are located on a spherical surface. Each satellite 12 establishes it own local region. Local regions preferably include all satellites that are within the radio horizon, or radio line-of-sight of each other. For example, satellite 12g defines local region 81. Local region 81 includes satellites 12a through 12h, 12j through 12m, and 12o. These thirteen satellites in local region 81 are within a radio line-of-sight of satellite 12g. Satellite 12i is not within radio line-of-sight of satellite 12g, and therefore is not included in satellite 12g's local region. Satellite 12i is below the radio horizon of satellite 12g. Local region 82, for example, is defined by satellite 12o, and includes satellites 12g, 12j through 12m, 12n, 12o, 12p, 12r through 12v. Local region 83, for example, is defined by satellite 12l and includes satellites 12d, 12f through 12i, 12k though 12q, and 12t.

As defined, all satellites in a local region are within radio line-of-sight of each other. Satellites outside a local region are below a radio line-of-sight of each other. For the example shown in FIG. 5, only three local regions are shown for clarity, although in the preferred embodiment, every satellite defines its own local region.

The number of satellites in any given local region will depend on several factors, including the number of satellites in the constellation, the type of orbit, the orbital positions and height of the satellites, and the relative positions of the satellites. As those of skill in the art will understand, when all satellites are in polar orbits, for example, the number of satellites in a local region increases as the satellites approach the poles. Likewise, when all satellites are in polar orbits, the number of satellites in a local region decreases as the satellites approach the equator. In a preferred embodiment, satellites 12 are in polar orbits. In this situation, satellites 12 are moving in flight path direction 85 which is directed toward or away from one of earth's poles. In the preferred embodiment discussed in FIG. 1, there are sixty-six satellites in a low-earth polar orbit. Although the examples discussed herein are for polar-orbiting satellites, the present invention is applicable to any orbiting satellite communication system where satellites are within a radio line-of-sight of each other.

In one embodiment of the present invention, local regions are defined to include only satellites over populated areas that are within line-of-sight of the satellite defining the local region. When this embodiment includes satellites in polar orbits or near-polar orbits, the large number of satellites that come into view when the defining satellite is over a polar region are excluded from the local region.

In another embodiment of the present invention, each local region contains a fixed number of satellites. The satellites comprising the local regions are determined when the defining satellite is between a maximum north and south latitude, preferably around fifty-five degrees latitude. An advantage to this embodiment is that the processing required onboard each satellite is simplified.

As can be seen by the example of FIG. 5, each satellite will be a member of several local regions. A satellite will be a member of the local region that it defines, and it will be a member of local regions defined by neighboring satellites. Regardless of the number of local regions that a satellite belongs to, each satellite is only required to have knowledge of channel assignments by members of its own local region. For example, satellite 12g (FIG. 5) is a member of local regions 81, 82 and 83, but is only required to have knowledge of channel assignments by satellites of local region 81, because local region 81 has been defined by satellite 12g. Satellite 12m, for example, is also a member of local regions 81, 82 and 83, but is not required to have knowledge of all the satellites in any of those local regions shown, because satellite 12m is not the defining satellite for either local regions 81, 82 or 83. Satellite 12m would be a defining satellite for its own local region, not shown.

In the preferred embodiment, channel assignments are allocated to subscriber units on the basis of the channel assignments made by other satellites in its local region. Preferably, a communication channel assigned by a defining satellite is non-interfering with channels assigned by other satellites within its local region.

In order to make channel assignments, knowledge of all channel assignments within a satellite's local region is preferable. Whenever a channel is assigned to a subscriber unit, the assigning satellite sends a message to all satellites in its local region. The message includes at a minimum, the specific communication channel assigned. In the preferred embodiment of FIG. 1, channel assignment messages between satellites are sent over links 21 and 23. The channel assignment method preferably uses the current local demand, current local distribution of users, and the set of channels that have already been assigned to make new assignments that provide acceptable interference performance. In the preferred embodiment where a combination of FDMA/TDMA channels are used, an example of a non-interfering communication channel includes a time-slot of a frequency channel not assigned to another subscriber unit.

The global effect of channel assignment is captured by use of interlocking local regions. Each satellite is not required to maintain or have true or real-time global knowledge of all channel assignments within the entire constellation. Satellites never exchange channel assignment information with satellites outside their local region. Satellites receive direct information from the satellites whose channels can interfere with them, and the chain reaction effect is captured because the regions interlock.

The interlocking effect can be described as follows: When a first satellite, having defined a first local region, assigns a channel, it indicates this to all other satellites within its local region. The choices of channel assignments for all the satellites within its local region becomes limited because the satellites within the local region can only assign non-interfering channels. Thus, a limited pool of available channels results for each satellite within the first local region. When one of the other satellites (a second satellite that has defined a second local region) in the first local region assigns a channel from this limited pool of channels, it informs all satellites within the second local region of this assignment. In one embodiment, the channel that the second satellite assigns is from this limited pool of channels that does not include channels assigned by satellites of the first local region that are not part of the second local region. This limits their choices of available channels for all satellites within the second local region. Since the second local region includes satellites not within the first local region, an assignment by the first satellite has an indirect effect on the pool of channels available outside of its own local region. This same effect is seen when channels are assigned on the basis of true, real-time global knowledge of all channel assignments within a constellation of satellites.

Figure 6:
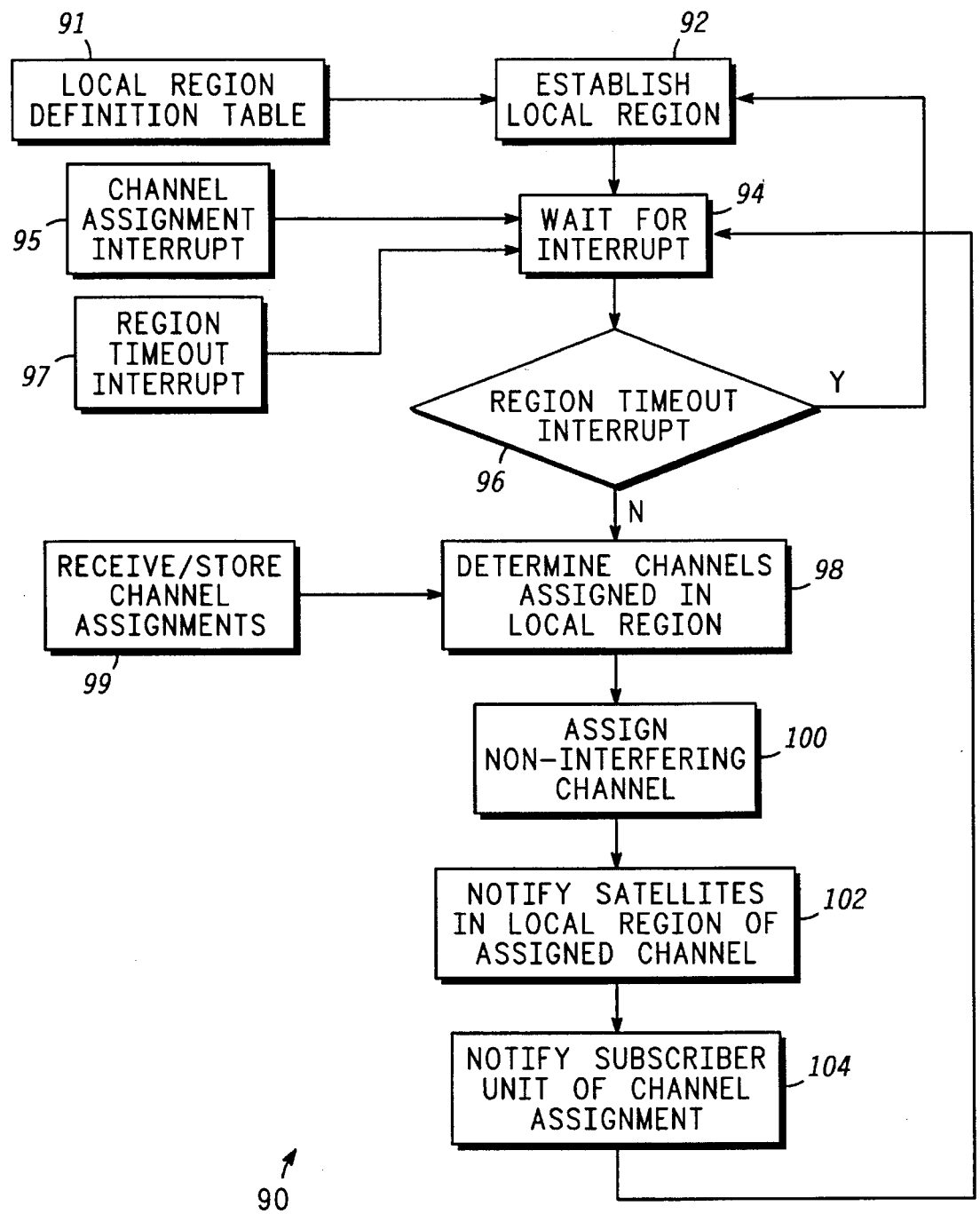
FIG. 6 shows a flow chart of a channel assignment procedure suitable for use in a preferred embodiment of the present invention.

FIG. 6 shows a flow chart of channel assignment procedure 90 suitable for use in a preferred embodiment of the present invention. In the preferred embodiment, procedure 90 is performed by satellite communication station 12 (FIGS. 1, 2 and 5). In task 92, a local region is established for the defining satellite. The local region preferably includes all satellites within a radio line-of-sight of the defining satellite communication station. In one embodiment, a local region definition table 91 is used. The local region definition table is preferably uploaded to the satellite by SCS 28 (FIG. 1) and includes a list of all satellites within a local region. When the satellites are moving in orbits, different local regions are defined for each orbital position of a satellite. For example, when the satellites are in polar orbits, there may be more satellites within a local region near the poles than near the equator. Preferably, there are different tables for each orbital position of the defining satellite.

In another embodiment, a local region is established by the receipt of data, such as channel assignments broadcasted by other satellites within line-of-sight. "Satellites include means for defining their local region." In this embodiment satellites may be given different time-slots in which to transmit channel assignments. In this way, channel assignment messages will not interfere with each other.

In task 94, procedure 90 waits for an interrupt. Either a request for a channel assignment for a subscriber unit (from task 95) or a region time-out (from task 97) causes an interrupt.

In task 95, a request for a channel assignment is received. The request indicates that a subscriber unit needs to have a communication channel assigned to it. A request may come from a subscriber unit, or alternatively a gateway or somewhere else in the communication system. The specific method of channel requests and acquisition is not important to the present invention.

In task 95, channel assignment requests may also come from hand-off requests. Hand-offs occur when a subscriber unit presently communicating on a traffic channel is switched to another antenna beam (beam-to-beam hand-offs). In a preferred embodiment, many more channel assignments are for hand-offs because the satellites are moving rapidly with respect to the surface of the earth and subscriber units must be transferred to the next antenna beam. Desirably, as a subscriber switches between antenna beams, and between satellites, the same channel is used in the subsequent antenna beam. Those of skill in the art will understand that many methods are suitable for channel hand-off and do not need to be described herein.

Task 97 generates region time-outs. As a satellite moves through different orbital positions through each orbit, different satellites comprise its local region. Thus, each orbital position should have a different local region of satellites established.

In task 96, if the interrupt was created by a request for channel assignment (task 95), task 98 is executed. If the interrupt was created by a region time-out, procedure 90 loops back to task 92 to establish a new local region for the next orbital position of the satellite.

In task 98, the channels that have been assigned by satellites within its local region are determined. The satellite receives messages (task 99) from members of it's local region so it knows which channels are currently in use by other satellites within its local region. In the preferred embodiment, a list of currently assigned channels with its local region is maintained by the defining satellite and stored in its memory.

In task 100, a non-interfering channel is assigned to the subscriber unit from channels allocated to the communication system. The non-interfering channel is chosen based on several factors including antenna pattern isolation, and the effects of propagation delay and Doppler frequency shift on currently assigned channels. The precise method of selecting a non-interfering channel is not important for the present invention. In the preferred embodiment, non-interfering channels are assigned based on a minimum channel reuse distance rule based on the antenna beam angular separation. The probability of two satellites of a local region assigning the same channel simultaneously is reduced by the rapid communication of channel assignments to satellites within their local regions. Furthermore, in the preferred embodiment, a large channel-set having up to several thousand non-interfering channels is allocated to the communication system. The large channel-set reduces the probability of two satellites simultaneously assigning the same channel within a local region.

In one embodiment of the present invention, pre-planned assignment pools based on geographically fixed regions are used for selecting available channels. In another embodiment, pre-planned assignment pools of channels are preferred by different satellites for assignment. Both of these embodiments reduce the possibility of two satellites simultaneously assigning the same channel within a local region.

In task 102, other satellites within the defining satellite's local region are notified that the channel assigned in task 100, has been assigned to a subscriber unit. This notification message is preferably transmitted directly to satellites within the defining satellite's local region over cross-links 21 and 23 (FIG. 1). As discussed above depending on how the local region is defined, in one embodiment the receipt of notification messages can be used by the receiving satellite to define its local region.

In task 104, a message is sent to the subscriber unit that a traffic channel has been assigned for communication. Transceivers in the satellite and the subscriber unit are switched to communicate with the subscriber unit over the assigned traffic channel rather that an acquisition or broadcast channel. After the traffic channel is assigned to the subscriber unit, procedure 90 loops back and repeats task 94 to wait for another channel assignment request or region time-out. When the subscriber unit has completed the call, the satellite receives notice and notifies each satellite in it's local region that the previously assigned channel is available.

In a preferred embodiment of the present invention, each satellite communication station of the constellation performs procedure 90 on a continual basis.

An advantage to the present invention is that the global effect of channel assignment is captured by use of interlocking local regions. Each satellite is not required to maintain or have true or real-time global knowledge of all channel assignments in the entire constellation. Satellites maintain channel assignment information of satellites within their local region. The present invention is superior to a global knowledge approach because satellites never exchange channel assignment information with satellites outside their local region. Furthermore, the communication bandwidth required to send channel assignment information around the network is greatly reduced. Another advantage is that the time required to propagate channel assignment information is greatly reduced. Satellites receive direct information from the satellites whose channels can interfere with them, and the chain reaction effect of channel assignment is captured because the regions interlock.

In addition, the present invention is superior to a channel assignment approach based on predicted demand because channel assignment is based on actual real-time demand. The uncertainties and limitations of predicted demand are avoided.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provide an improved methods of operating various parts of a communication system. These advantages include a dynamic assignment of communication channels in real-time based on actual demand. The tradeoff between system capacity and channel interference is optimized through the use of interlocking local regions.

What is claimed is:

1. A method of operating a node in a communication system comprised of a plurality of nodes, each node projecting antenna beams on earth's surface, said method comprising the steps of:

establishing a local region associated with said node, said local region comprising a set of nodes of said plurality of nodes that are within a radio line-of-sight of said node;

assigning a channel to a subscriber unit, said channel being non-interfering with channels currently assigned by said node and by said set of nodes of said local region, said subscriber unit being within said antenna beams associated with said node; and notifying each node of said set of nodes of said local region that said channel has been assigned by said node wherein said plurality of nodes are satellite communication stations.

2. A method as claimed in claim 1 further comprising the step of determining channels currently assigned by said set of nodes, and wherein the assigning step assigns said channel from a pool of channels, said pool of channels comprising channels not currently assigned by any node of said set of nodes.

3. A method as claimed in claim 2 wherein the determining step includes the step of receiving a message from at least one node of said set of nodes, said message informing said node of channels assigned by said at least one node.

4. A method as claimed in claim 3 further comprising the step of storing said channels assigned by said at least one node in a channel assignment table, and wherein the determining step includes the step of comparing channels in said channel assignment table with said channels not currently assigned.

5. A method as claimed in claim 1 wherein the notifying step includes the step of sending a message to each node of said set of nodes of said local region, said message informing each node of said set of nodes of said channel assigned in Said assigning step.

6. A method as claimed in claim 1 further comprising the step of receiving a request from said subscriber unit requesting assignment of an available channel.

7. A method as claimed in claim 6 further comprising the steps of:

receiving notice that said subscriber unit has completed a call; and notifying each node of said set of nodes that said channel is available.

8. A method as claimed in claim 1 wherein:

the establishing step includes the step of defining, by a first node of said plurality of nodes, a first local region associated with said first node, said first local region comprising a first set of nodes that are within said radio line-of-sight of said first node;

the assigning step includes the step of assigning, by said first node, a first channel to said subscriber unit, said first channel being non-interfering with channels currently assigned by said first node and said first set of nodes of said first local region, said subscriber unit being within said antenna beams associated with said first node; and the notifying step includes the step of notifying, by said first node, each node of said first set that said first channel has been assigned by said first node.

9. A method as claimed in claim 8 further comprising the steps of:

establishing a second local region by a second node of said plurality of nodes, said second local region including a second set of nodes that are within a radio line-of-sight of said second node, some nodes of said second set being members of said first set of nodes, some member nodes of said second set that are not members of the first set are not within a radio line-of-sight of some of said members of the first set;

assigning a second channel to a second subscriber unit, said second subscriber unit located within a second antenna beam that is associated with said second node, said second channel being non-interfering with channels currently assigned by said second node and nodes of said second set, said second channel being from a limited pool of channels that does not include channels assigned to nodes of said first set that are not part of the second set; and notifying nodes of said second set that said second channel has been assigned by said second node.

10. A method as claimed in claim 1 further comprising the step of establishing, by each node of said plurality of nodes, an associated local region that overlaps adjacent local regions.

11. A method as claimed in claim 1 wherein said node is a satellite communication station in a near-polar orbit, and wherein the establishing step includes the step of defining said local region including a predetermined number of satellites that are within said radio line-of-sight when said node is between maximum northern and southern latitudes of fifty-five degrees during said polar orbit.

12. A method as claimed in claim 1 wherein said node is a satellite communication station in an orbit, and said method further comprises the step of redefining said local region for different orbital positions of said node.

13. A method as claimed in claim 1 wherein the establishing step is performed by each node of said plurality of nodes, and said method further comprises the step of notifying, by each node, other nodes of its associated local region whenever one node assigns a channel to a subscriber unit.

14. A method of operating a communication system comprised of a plurality of communication nodes, said method comprising the steps of:

receiving, at a first node, notice of channel assignments from nodes within a radio line-of-sight of each other;

determining, at said first node, a pool of available channels based on said notice of channel assignments; and assigning, by said first node, a channel from said pool to a subscriber unit located within a service area of said first node wherein said plurality of nodes are satellite communication stations.

15. A method as claimed in claim 14 further comprising the step of defining a local region associated with said first node, said local region comprising nodes of said plurality of nodes that are within said radio line-of-sight of said first node.

16. A method as claimed in claim 15 further comprising the step of notifying each node of said local region that said channel has been assigned by said node.

17. A method as claimed in claim 16 wherein at least some of said communication nodes are orbiting satellites, and wherein said method further comprises the step of redefining said local region for different orbital positions of said node.

18. A communication station comprising:

a transceiver for transmitting and receiving data to and from other communication stations that are within a radio line-of-sight of said communication station; and a processor coupled to said transceiver, said processor including:

means for defining a local region associated with said communication station, said local region comprising said other communication stations; and means for assigning a communication channel to a subscriber unit, said communication channel being non-interfering with communication channels currently assigned by said other communication stations of said local region, and wherein said transceiver includes means for notifying each communication station of said local region that said communication channel has been assigned by said communication station, wherein said communication station and other communication stations are satellite communication stations.

19. A communication station as claimed in claim 18 further comprising:

a second transceiver coupled to said processor for producing antenna beams for communicating with said subscriber unit, wherein said subscriber unit is located within one of said antenna beams; and a means for storing channel assignments coupled to said processor, and wherein said transceiver includes means for receiving messages from said other communication stations, said messages informing said communication station of communication channels assigned by said other communication stations;

said means for storing contains a channel assignment table comprising said communication channels assigned by said other communication stations; and said processor includes means for comparing communication channels in said channel assignment table with communication channels not currently assigned by said other communication stations of said local region.

* * * * *